United States Patent
Yegnanarayanan et al.

(10) Patent No.: US 6,580,863 B2
(45) Date of Patent: Jun. 17, 2003

(54) SYSTEM AND METHOD FOR PROVIDING INTEGRATED OPTICAL WAVEGUIDE DEVICE

(75) Inventors: Sivasubramaniam S Yegnanarayanan, Los Angeles, CA (US); Dale L Capewell, Agoura Hills, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/004,234

(22) Filed: Oct. 31, 2001

(65) Prior Publication Data

US 2003/0081924 A1 May 1, 2003

(51) Int. Cl.[7] .................................................. G02B 6/00
(52) U.S. Cl. ........................ 385/132; 385/129; 385/131
(58) Field of Search ............................... 385/132, 130, 385/131, 133, 14, 42, 49, 60, 59, 78

(56) References Cited

U.S. PATENT DOCUMENTS

| | | | | |
|---|---|---|---|---|
| 4,787,691 A | * | 11/1988 | Lorenzo et al. | ............. 385/131 |
| 4,997,246 A | * | 3/1991 | May et al. | ................... 385/131 |
| 5,237,639 A | * | 8/1993 | Kato et al. | ................... 385/131 |
| 5,838,870 A | * | 11/1998 | Soref | .......................... 385/131 |

* cited by examiner

Primary Examiner—Phan T. H. Palmer
(74) Attorney, Agent, or Firm—Pillsbury Winthrop LLP

(57) ABSTRACT

Optical filters in, for example, a wavelength division multiplexing (WDM) fiber optic system or an optical waveguide device are utilized and provided. The optical waveguide device comprises a lower substrate layer, an insulating dielectric layer and a waveguide ribs layer. The insulating dielectric layer, having a first refractive index, is positioned above the lower substrate layer. The waveguide ribs layer, having a second different refractive index, is positioned above the dielectric layer. An optical waveguide is formed from the waveguide ribs layer for transmission of light. In the waveguide ribs layer, an optical filter structure formed, wherein the optical filter structure is integrated onto the same substrate as the optical waveguide.

35 Claims, 12 Drawing Sheets

SYSTEM AND METHOD FOR PROVIDING INTEGRATED OPTICAL WAVEGUIDE DEVICE

BACKGROUND OF THE INVENTION

1. Field of the Invention

The present invention relates to optical communications, and in particular, to a system and method for providing an integrated optical waveguide device for wavelength multiplexing, wavelength demultiplexing and mode-matching.

2. Related Art

Wavelength division multiplexing (WDM) has been proven as a powerful technology for increasing the capacity of fiber optic communications links as well as in providing all-optical routing and switching of data traveling in such links. Presently, WDM is widely deployed in long haul and metropolitan area networks (MAN). In a WDM fiber optic system, several independent optical signals are transmitted from the transmission end of the system. The optical signals, each having a different optical wavelength, are transmitted through a single optical fiber, either single mode or multi-mode. The single mode fiber is usually used for longer distances, while the multimode fiber is usually used for shorter distances. At the receiving end of the WDM fiber optic system, the different wavelength optical signals are detected and separated in accordance with their wavelength. This allows multiple data channels to be created over one optical fiber. For example, four wavelengths can be used to increase the fiber capacity by a factor of four.

Different versions of WDM are defined in terms of the wavelength, or channel, separations. For narrow channel separation, the term "dense WDM" is used, and for wide channel separation, either "coarse WDM" or "wide WDM" are used. WDM also provides similar advantages in local area networks (LAN) and access networks. In such networks, WDM offers scalable bandwidth capacity while enhancing the value of the embedded fiber plant, without the need to rewire the premises for future bandwidth upgrades. Furthermore, the parallel nature of the WDM link means that for a given link capacity, lower cost, lower capacity optical/electronic components may be used for each wavelength.

One of the key components in a WDM transmission link is an optical filter. Optical filters serve many functions in a WDM fiber optic system. At the transmission end, optical filters, each with different passband wavelengths, are often used to provide different wavelength channels, allowing the different wavelength channels to be combined together in a multiplexing function. At the receiving end, the optical filter is often used to separate the different wavelength channels in a demultiplexing function. In most cases, the same optical filters are utilized to perform the multiplexing function in the transmission end as well as the demultiplexing function at the receiving end.

As the demand for data speed continues to increase, channel counts in WDM fiber optic systems need to be increased and channel spacing in WDM fiber optic systems need to be narrowed. Presently, the channel counts in conventional WDM fiber optic systems are moving toward several hundred WDM channels and the channel spacing is moving toward 50 GHz to 25 GHz. As a result, it is desirable for WDM fiber optic systems to be made compact, allowing them to scale to large channel count, narrow channel spacing WDM fiber optic systems. Because WDM fiber optic systems should preferably be compact in size, optical filters included in the WDM fiber optical systems also need to be compact. Many different techniques have been developed to realize WDM filters and/or WDM fiber optic systems. Examples of these techniques include arrayed waveguide gratings, Fiber Bragg gratings, and hybrid integration of thin-film filters with waveguides. Disadvantages are, however, associated with each of these techniques.

Arrayed waveguide grating is an attractive technique to manufacture WDM devices with large channel counts. It operates on similar principle as a Mach-Zehnder interferometer. Several copies of the input signal, which are phase shifted by different amounts, are added together in order to realize n×1 wavelength multiplexer or 1×n wavelength demultiplexer. The input and output waveguides, the multiport couplers and the arrayed waveguides are all fabricated on a single substrate. However, in a system that employs arrayed waveguide gratings, waveguide bends and large arrays of waveguides are required to achieve narrow channel resolution. Due to this requirement, such gratings tend to occupy a large area of the waveguide substrate.

Fiber Bragg gratings are formed by imposing a periodic perturbation of the refractive index in the core of the optical fiber. One method to realize such refractive index changes is to expose the fiber core to ultraviolet light. At a resonant wavelength, i.e., the Bragg wavelength, light is scattered by the periodic index grating from a forward wave into a reflected wave. A circulator is used at the input to extract the resonant wavelength that is propagating in the reverse direction. A circulator is bulky and is required for each Bragg grating. Therefore, the fiber Bragg grating devices cannot be easily scaled to large channel count WDM systems.

Hybrid integrating of thin-film filters with waveguides is typically implemented with Dielectric Thin Film (DTF) Filters. DTF filters are made using well-established techniques for manufacturing optical filters. A desired passband is obtained by cascading several Fabry-Perot (FP) type filters. Each FP filter comprises multi-layers of dielectric films deposited on a substrate that is transparent to the wavelengths of interest. The films are typically deposited by evaporation. The composite structure is then cut into pieces comprising individual filter elements. A wafer upon complete fabrication would yield several thousands of WDM filter pieces. These optical filter pieces are then aligned precisely with the input/output optical fiber and packaged. By choosing the appropriate films and controlling their thickness, the desired center wavelength and the width of the filter passband are engineered.

Several deficiencies, however, are associated with a system having hybrid integration of DTF filters and waveguides. For the present generation of 10 GHz WDM fiber optical systems, 200 or more layers of dielectric films are required in the DTF filter structure. There are already several manufacturing issues with maintaining the uniformity and thickness of the layers in such a complex structure. It is anticipated that more difficulties will be encountered using DTF technology to scale to future 50 GHz and narrower WDM filter optic systems. Furthermore, because of the need to preserve optical, thermal and mechanical properties of the thin-film layer stack, the smallest DTF filter pieces available are approximately 1 mm². This prevents ultra-small filter structures in the $\mu$m range from being created. Moreover, for applications in fiber optic communication, a method must also be devised to couple the light into an array of DTF filters, each having a center wavelength that is identical to one of the WDM channels. This is typically accomplished using reflection in a second dielectric substrate. Precise alignment of the DTF filter with the optical fibers is accomplished using lens couplers or hybrid packaging schemes. Such hybrid packaging schemes require precision alignment steps that are expensive and time-consuming.

In view of the above deficiencies associated with the conventional WDM fiber optic systems, a need exists for a system and method to provide fiber optic systems that are not only compact in size but are also easily scalable to large channel counts and narrow channel spacing. Moreover, the cost of the optical components, such as filters and multiplexers, is dominated by the cost of hybrid packaging the WDM filter with the input and output optical fibers. This is largely due to the manual alignment process and the sub-micron accuracy required for low insertion loss device. Therefore, a need also exists for avoiding expensive and time-consuming optical alignment procedures required with the conventional WDM fiber optic systems. The system and method of present invention is relatively inexpensive to produce and carry out, while being suitable for straightforward and consistent quality manufacturing.

DETAILED DESCRIPTION

Figure 1:
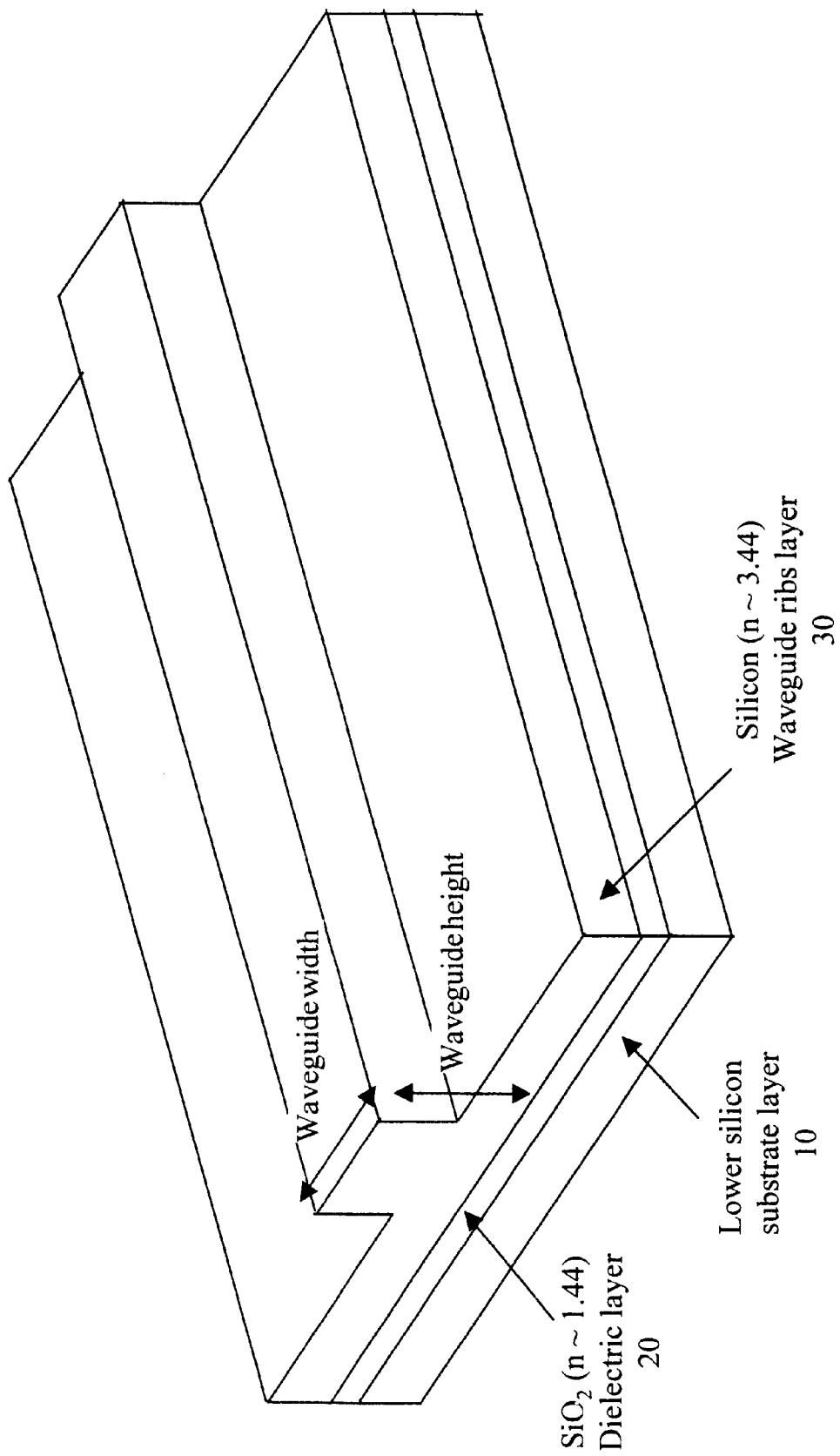
FIG. 1 shows a Silicon-on-Insulator waveguide system in which embodiments of the present invention may function.

Embodiments of the present invention are directed to addressing the aforementioned drawbacks associated with providing WDM fiber optic systems. One of the features of the present invention is to provide a compact and cost effective fiber optic system, which is scalable to large channel count and narrow channel spacing. A method of fabricating a compact optical filter structure is provided by realizing a large index-contrast grating. The compact optical filters are combined with integrated waveguides on a single planar substrate. The integrated fabrication process for the optical filters and the optical waveguides ensures pre-alignment of the optical filters and the optical waveguides. This waveguide coupled filter structure on the same planar substrate alleviates expensive and time consuming hybrid alignment of the optical filter and the optical waveguide. The waveguide coupled filter structure, owing to its integrated optic design, is amenable to a highly compact implementation.

Another feature of the present invention is to combine a zig-zag waveguide structure with the above waveguide coupled filter structure to realize a WDM fiber optic system. Each WDM channel or optical waveguide is fabricated with a unique grating optical filter, such that light with certain wavelengths is reflectively coupled into the next waveguide while light with certain other wavelengths is not reflected and passes through the grating optical filter. The unique optical filter is integrated onto the same planar substrate as its corresponding optical waveguide.

A further feature of the present invention is to provide techniques to couple light efficiently into the optical chip. A mode expansion structure is introduced at the input of an optical waveguide, wherein a vertical waveguide taper is formed, for example, by using multi-step lithography or introducing chirped periodic discontinuity. This provides mode-matching to optical fibers and eases the tolerance requirements for packaging the integrated optical chip with external optical fiber inputs or outputs.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" or "according to an embodiment" appearing in various places throughout the specification are not necessarily all referring to the same embodiment.

Embodiments of the present invention are directed to a system and method for providing integrated optical waveguide devices, which are implemented for wavelength multiplexing, wavelength demultiplexing and mode-matching. The system is preferably based on planar integrated multiplexing and demultiplexing devices, which are amenable to highly compact implementation. Moreover, the power of integrated circuit style batch processing in the manufacturing of these planar integrated devices, such as a planar waveguide device, lowers manufacturing costs.

FIG. 1 shows a silicon-on-insulator (SOI) optical waveguide system in which embodiments of the present invention may function. The SOI structure allows low-cost integrated optical waveguide technology to be implemented. There are several unique advantages in a SOI system. First, silicon provides low optical propagation loss within a long-wavelength telecommunication window, e.g., $\lambda > 1.2$ $\mu$m. Second, there is direct compatibility between this technology and microelectronic IC fabrication techniques. Third, silicon allows the possibility of electro-optic or thermo-optic tuning. Finally, hybrid integration with optoelectronic devices may be obtained by utilizing well-known silicon optical bench technology.

The optical waveguides in the SOI optical waveguide system in FIG. 1 may be designed for attachment to, and operation with, conventional single-mode or multi-mode optical waveguide fibers. The SOI optical waveguide comprises a lower silicon substrate layer 10, a dielectric layer 20, and a waveguide ribs layer 30. In a preferred embodiment, a crystalline silicon substrate is subjected to ion implantation to form a dielectric layer 20 below the surface of the crystalline silicon substrate but above the lower silicon substrate layer 10. High energy ionized oxygen or nitrogen species are implanted in the crystalline silicon substrate in order to convert this buried layer of silicon into silicon dielectric compounds such as silicon oxide ($SiO_2$) or silicon nitride ($Si_3N_4$). In FIG. 1, $SiO_2$ is depicted as the dielectric layer 20. The depth of the buried dielectric layer 20 is typically 0.5 to 1 micron and is controlled by the implant energy and ion flux. One of the functions of the dielectric layer 20 maintained underneath the waveguide ribs layer 30 is to prevent tailing of optical signals into the silicon substrate layer 10. The dielectric layer 20 prevents significant penetration of signals through the dielectric and into the lower silicon substrate layer 10.

The device is then etched and patterned to provide exposed waveguide ribs layer 30 of crystalline silicon on top of the previously formed dielectric layer 20. The patterning can involve wet or dry etching techniques. The patterning can also involve selective oxidation by further oxygen or nitrogen ion implantation through a suitable mask. In FIG. 1, a straight channeled waveguide is geometrically patterned to provide a lateral confinement for optic signals. If a particular design dictates, epitaxial silicon (not shown) can be added to make the waveguide ribs layer 30 thicker. A passivating layer (not shown) can also be formed on top of the waveguide ribs layer 30. The passivating layer can either be deposited conventionally or formed by conversion of surface through ion implantation. In one embodiment, the waveguide is substantially rectangular in cross section, with the waveguide width and waveguide height as indicated in FIG. 1. The waveguide may, for example, be approximately 70 microns high by 100 microns wide. Alternatively, other dimensions and shapes may be used for waveguides in an SOI optical waveguide system.

With the configuration as shown in FIG. 1, a high refractive index contrast is created in the SOI waveguide system. The refractive index of the waveguide ribs layer 30 of crystalline silicon is about 3.44. The refractive index of the $SiO_2$ dielectric layer 20 is about 1.44. If $Si_3N_4$ is used as the dielectric layer 20, then the refractive index thereof is about 1.96. The waveguide is optically isolated due to this high refractive index contrast. The large SOI index contrast serves the important function of confining the light being transmitted tightly to the waveguide core. This reduces optical propagation loss when light travels through the waveguide. In other embodiments, the waveguide may also be integrated with silicon electro-optic and electronic components.

Figure 2:
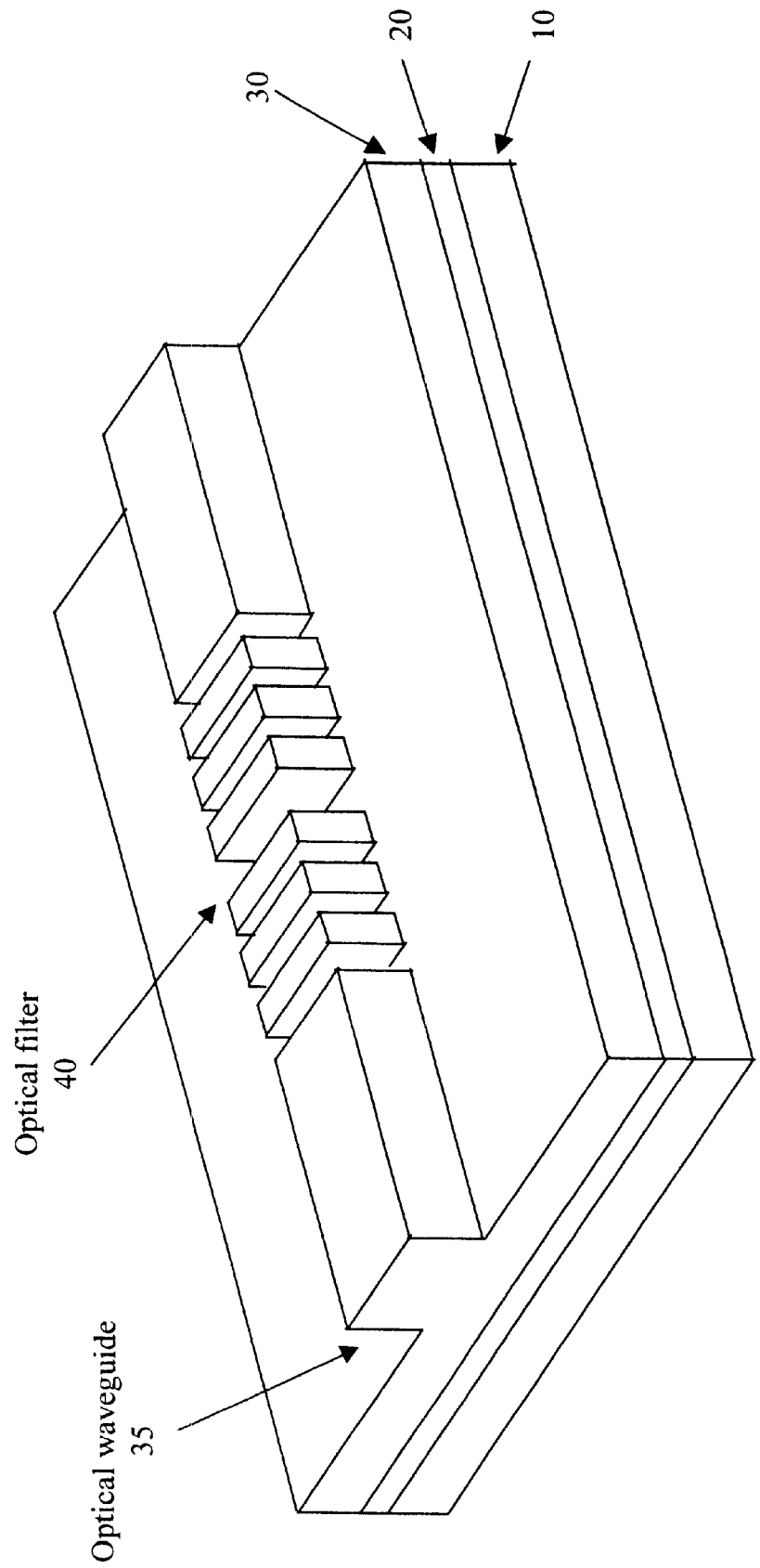
FIG. 2 shows an optical waveguide with an integrated optical filter according to an embodiment of the present invention.

FIG. 2 shows an optical waveguide with an integrated optical filter according to an embodiment of the present invention. A dielectric layer 20 is formed within a silicon substrate. The waveguide ribs layer 30 resides on top of the dielectric layer 20, and the lower silicon substrate layer 10 is below the dielectric layer 20. An optical waveguide 35 is formed from the waveguide ribs layer 30. The optical filter 40 is integrated onto the same planar substrate as the optical waveguide 35. The optical filter 40 may, for example, be a WDM filter. As shown in FIG. 2, the optical filter 40 may be comprised of multi-cavity filters. The large refractive index contrast, such as the one available in SOI waveguide systems, enables multi-cavity filters to be fabricated. The refractive index of the waveguide ribs layer 30 of crystalline silicon is about 3.44, while the refractive index of the $SiO_2$ dielectric layer 20 is about 1.44.

In one embodiment, multi-cavity filters are referred to as one-dimensional photonic band gap (PBG) structures, which are periodic dielectric structures that prohibit propagation of electromagnetic waves in a certain frequency range. These one-dimensional PBG grating filter devices can be designed using approaches similar to multi-cavity DTF filters. In one embodiment, filters with high Q-factors may be realized using a few hundred grating periods. Due to the high refractive index contrast that is available in the SOI waveguide system, the WDM filters 40 can be made as small as 20 μm in length. The compact size of the WDM filters 40 helps to reduce the overall size of a WDM fiber optical system.

In one implementation, the entire optical waveguide 35 with integrated optical filter 40 structure is fabricated in one single lithography or etching step. However, under certain circumstances, e-beam writing of long optical waveguides may be costly. In another implementation, the optical waveguide 35 and the optical filter 45 are fabricated in separate steps with alignment of the substrate between successive processing steps using conventional mask alignment tools.

With the above waveguide-filter integrated design, precision alignment processes using lens couplers or hybrid packaging schemes are not needed. Manufacturing difficulties, such as those associated with WDM fiber optic systems employing DTF filters, are eliminated. Moreover, the optical filter 40 is directly aligned with the optical waveguide 35, and may, for example, be made as small as the optical waveguide 35 itself This results in filters of the size of 10 μm×10 μm×20 μm, or even smaller. Thus, a highly compact filter structure is achieved without the need for expensive passive alignment techniques. In other embodiments, large channel count filter structures are realized by cascading several optical filters with a number of waveguides.

Figure 3:
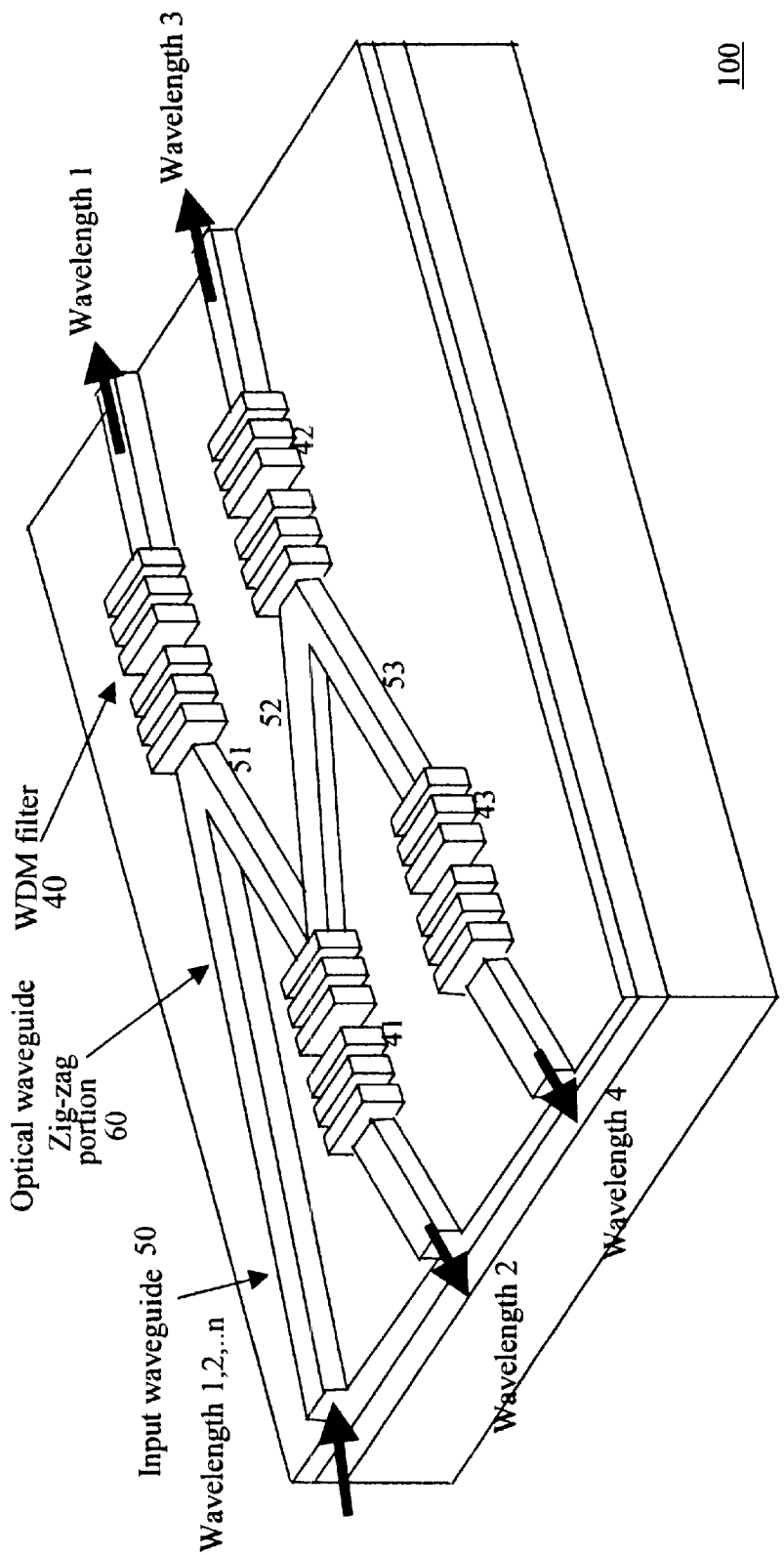
FIG. 3 shows a zig-zag optical waveguide structure with integrated WDM filters according to an embodiment of the present invention.

FIG. 3 shows a zig-zag optical waveguide structure with integrated WDM filters according to an embodiment of the present invention. The zig-zag optical waveguide structure and the integrated WDM filters combine to form a zig-zag optical waveguide demultiplexing device 100. The zig-zag characteristic is reflected in the zig-zag patterned waveguides etched from the silicon substrate. In one embodiment, the zig-zag optical waveguide demultiplexing device 100 is manufactured using methods similar to those used in conventional semiconductor integrated circuits. Electron-beam lithography is used to write the grating pattern on the photoresist. This involves a serial technique, and the large e-beam pattern exposure area requires long writing times. In another embodiment, an alternative technique is utilized to write the grating pattern onto the photoresist using an optical phase mask and a coherent incident beam. The mask and beam work in conjunction to form an interference pattern on the photoresist. Such an approach allows the transfer of an entire grating structure(s) onto the photoresist in a parallel fashion. Subsequent to the photolithography step, the pattern may be transferred to the waveguide substrate using anisotropic etch techniques, such as reactive ion-etching.

In a preferred embodiment, as shown in FIG. 3, the zig-zag optical waveguide demultiplexing device 100 is a planar optical device that includes two or more optical waveguides positioned such that two adjacent optical waveguides with integrated WDM filters converge at a point. In this example, four optical waveguides 50–53 are illustrated. The zig-zag optical waveguide demultiplexing device 100 is formed by a number of waveguides and integrated WDM filters. The demultiplexing device 100 comprises an input optical waveguide 50, optical waveguides 51–53 in an optical waveguide zig-zag portion 60, and WDM filters 40–43. The WDM filters 40–43 may, for example, be grating filters that are integrated in close proximity to the optical waveguides. The WDM filters 40–43 are utilized to transmit light in a particular wavelength range out of the demultiplexing device 100, while reflecting light in another wavelength range(s) into a subsequent waveguide.

As can be seen from FIG. 3, light containing several constituent wavelengths (e.g., wavelength 1, 2, . . . n) is coupled directly from an external optical fiber (not shown) into the input waveguide 50 of the demultiplexing device 100. The input waveguide 50 then couples the light containing the constituent wavelengths into the optical waveguide zig-zag portion 60. In one embodiment, as shown in FIG. 3, the input waveguide 50 resides on the same silicon substrate in which the optical waveguide zig-zag portion 60 resides. In other embodiments, the input waveguide 50 may be embedded in another substrate separate from the substrate in which the optical waveguide zig-zag portion 60 resides. As the light enters the optical waveguide zig-zag portion 60, it encounters the first WDM filter 40, which has filter characteristics that correspond to wavelength 1. Thus, light of the particular wavelength 1 is transmitted out of the demultiplexing device 100, through the back portion of the input waveguide 50, while light of the remaining wavelengths is reflected into a subsequent waveguide. In this case, the subsequent waveguide is the waveguide 51 of the optical waveguide zig-zag portion 60.

As the light with the remaining wavelengths travels through the waveguide 51, it encounters the second WDM filter 41, which has filter characteristics that correspond to wavelength 2. The second WDM filter 41 transmits light of the particular wavelength 2 out of the demultiplexing device 100 and reflects light of the remaining wavelengths into the waveguide 52 of the optical waveguide zig-zag portion 60. This light travels through the waveguide 52, and light of the particular wavelength 3 is transmitted out of the demultiplexing device 100 by the third WDM filter 42 in a similar fashion as above. Similarly, light of the particular wavelength 4 travels through the waveguide 53 and is extracted by the fourth WDM filter 42. By cascading several optical filters with zig-zag type waveguide structures, large channel count WDM fiber optic systems are realized.

The present invention differs from WDM fiber optic systems that utilize DTF filters. Instead of hybrid packaging a zig-zag waveguide structure with DTF filters, the filter is fabricated in the same substrate as the zig-zag optical waveguides. This ensures easy coupling from the optical waveguides to the grating section. Moreover, in the hybrid packaging approach, the waveguide mode diverges when it exits the waveguide and enters the DTF filters. As a result, tapered mode devices are used to obtain small beam divergence. With the integration of the grating filter in close proximity to the optical waveguide in the present invention, the problem of beam divergence is reduced. Because of the closeness of the grating filter and the optical waveguide, light passing through the optical waveguide and entering into the grating filter does not diverge much, as compared to an arrangement in which the two elements are further apart. Additionally, the zig-zag optical waveguide structure with integrated grating filters is compatible with conventional silicon optical bench technology, which serves as a platform for hybrid integration of the filters with photodetector/laser devices using well known packaging techniques, such as flip-chip assembly, V-groove techniques and other passive alignment techniques.

Figure 4:
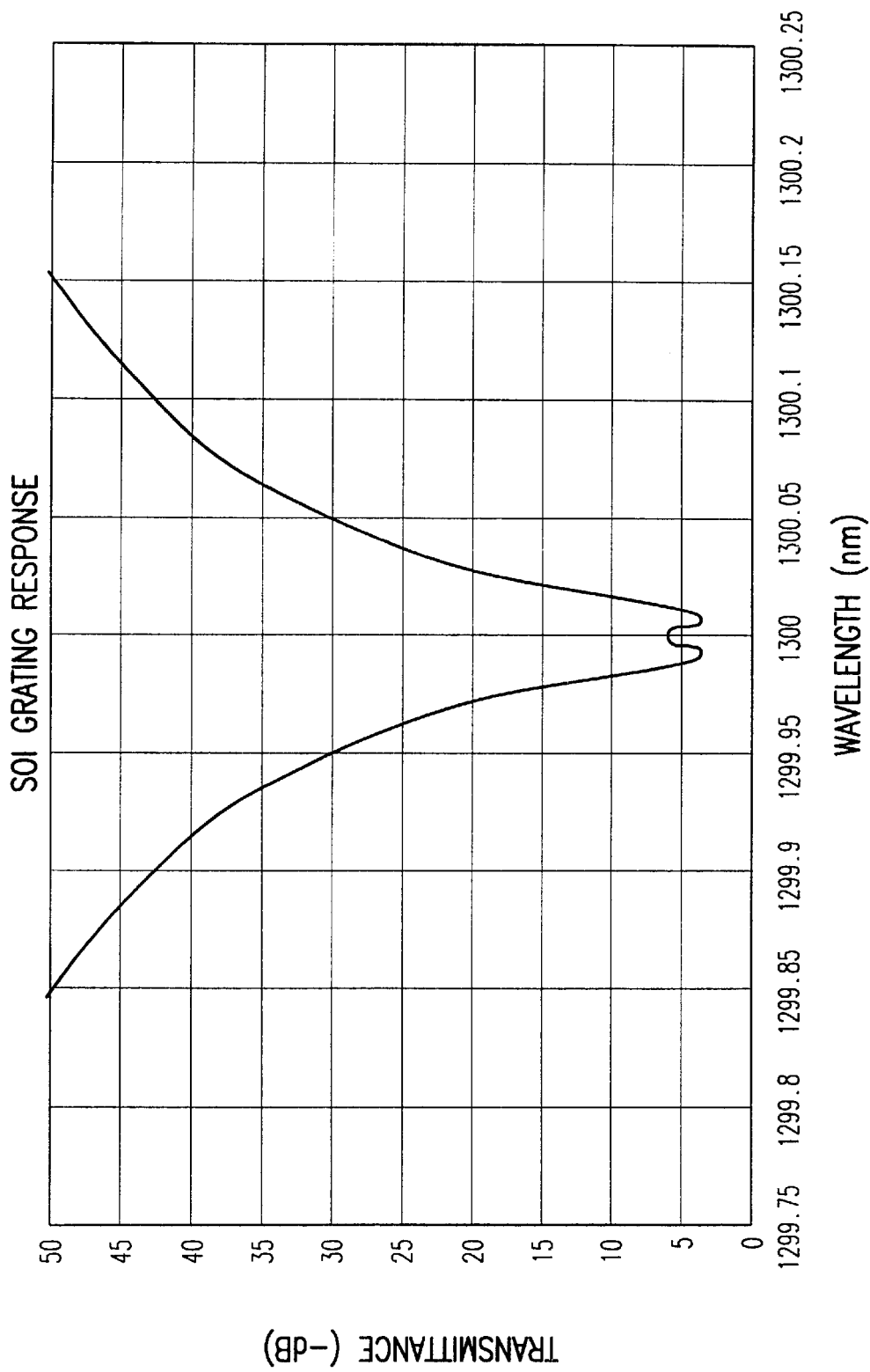
FIG. 4 is a graph showing transmission through a 25 GHz passband optical filter according to an embodiment of the invention.

With the present invention, ultra-small grating filters of the size of a single-mode optical waveguide are realized. In one implementation, the size of the grating filters is as small as 10 μm×10 μm in transverse dimensions. This is a drastic improvement from the size of DTF filters, which is about 1 mm×1 mm in transverse dimensions to prevent damages to the DTF filter stack. For example, FIG. 4 shows transmission through a 25 GHz passband optical filter according to an embodiment of the invention. The SOI grating spectral response of a 25 GHz optical passband is obtained by using a grating filter having a length of approximately 7 μm. The small filter size enables easy scaling of the filter to large channel count WDM systems. It also allows direct coupling of filter output, through hybrid packaging techniques, to small area high-speed photodiode arrays. Moreover, since the entire filter structure is realized using a single lithography or etch step, the complexity of fabricating the grating filter remains unchanged even in complicated filter designs with more than 200 dielectric interfaces.

Typically, due to fabrication tolerance, the wavelengths of the grating filters would not be exactly at the design wavelengths. Usually a certain amount of fine-tuning or post-fabrication trimming of the filter response is required to adjust the wavelengths. Because of the integrated waveguide technique, simple thermo-optic/electro-optic active elements may be readily integrated in close proximity to the grating filter. This facilitates the ease of filter fine-tuning using the large thermo-optic effect in silicon waveguides.

In many conventional integrated optic waveguide devices, optical waveguide bends are required to interconnect optical elements. These waveguide bends need to be smooth in order to have low bend-induced radiative loss. The requirement of such bends in arrayed waveguide grating type devices results in large device dimensions. As a result, highly compact filter device structure cannot be achieved. One of the advantages of the zig-zag structure utilized in an embodiment of the present invention is the absence of optical waveguide bend sections. Since the zig-zag portion of the structure requires only straight waveguides and eliminates the requirement of waveguide bends, highly compact filter device structure and WDM fiber optic system are able to be realized. If optical waveguide bends are required for specific applications, the large index contrast available in a SOI waveguide system allows ultra-small bend radii and sharp optical waveguide bends to be created. The bend radius may, for example, be on the order of 20–100 μm. This allows for a more compact structure.

Figure 5:
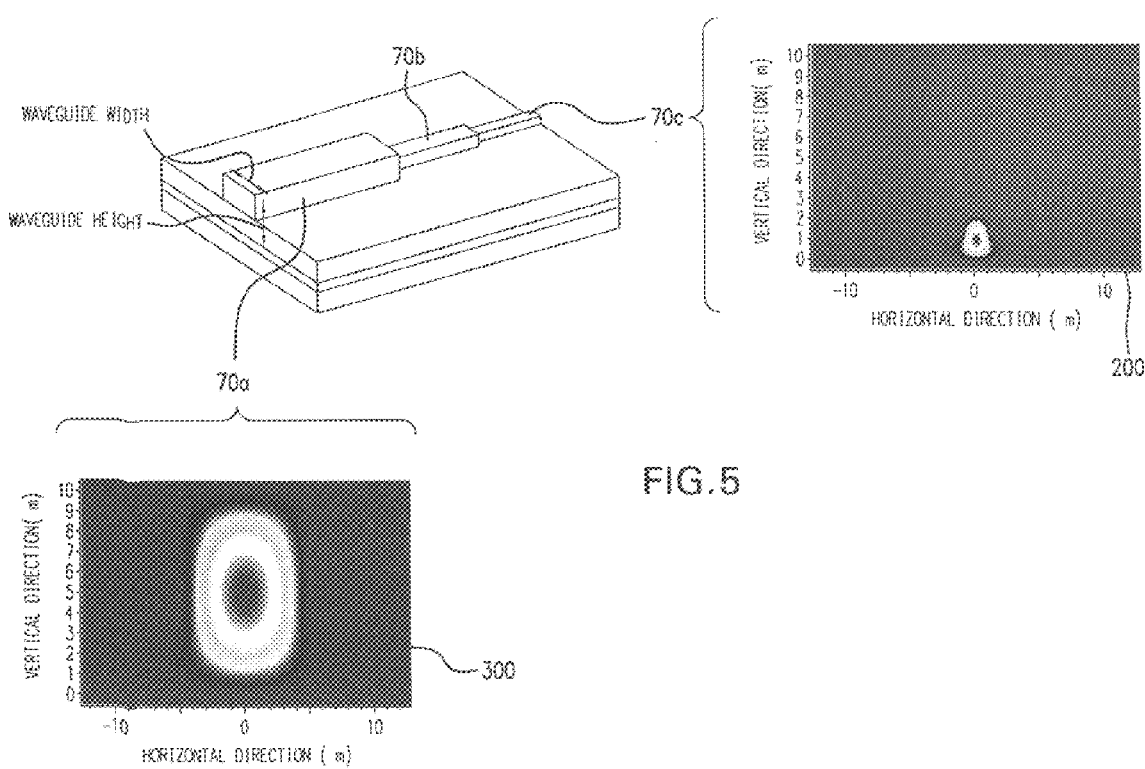
FIG. 5 shows an integrated optical mode taper structure according to an embodiment of the invention.

One major disadvantage of planar integrated optics, such as a SOI waveguide system, is the highly expensive alignment step to accurately align the larger optical fiber mode to the smaller optical waveguide mode. The larger optical fiber mode is roughly circular with a 10 μm mode diameter, while the small optical waveguide mode is usually anywhere between 1–5 μm in diameter. This large mismatch in the mode size results in tight alignment requirements and small tolerance to alignment errors. To avoid tight alignment requirements and introduce more tolerance to alignment errors, the optical mode in the waveguide is "expanded" to ease optical fiber-waveguide coupling. In one embodiment, a waveguide size taper is used. FIG. 5 shows an integrated optical mode taper structure according to an embodiment of the invention. The integrated optical mode taper structure may, for example, expand the mode size from 2 μm to 10 μm, as shown in FIG. 5. Diagram 200 shows the 2 μm mode size before the expansion, and diagram 300 shows the 10 μm mode size after the expansion. Lateral waveguide taper is simply realized in a single-step lithography, with both discrete and continuous tapering being available. However, a vertical waveguide taper, such as the one shown in FIG. 5, is more difficult to realize in a single-step lithography process. In one implementation, a vertical waveguide taper is formed by multi-step lithography or etch, as shown in FIG. 5. The waveguide is etched to different etch depths in each lithography step. For example, in the first etching step, a section 70a is formed. In the second etching step, a section

70b, which has a lower etch depth than the section 70a, is formed. In the final etching step, a section 70c, which has a lower etch depth than both sections 70a, 70b, is formed. This creates a discrete stair-case taper in the vertical dimension. The discrete taper can be further smoothed by using simple isotropic etches, such as a chemical etch to round the edges.

In another implementation, a waveguide taper is obtained by introducing chirped periodic discontinuity in the optical waveguides. Provided that the period of the periodic discontinuity is tapered and does not resonant with the wavelengths transmitted in the optical waveguide, an effective medium index is obtained that can be diluted by varying the duty cycle of the periodic waveguide. The reduction in the effective medium index results in a reduced confinement factor for the optical mode. Thus, a gradual expansion of the optical mode is realized in the chirped periodic waveguide. The light is efficiently coupled into the optical chip from the optical fiber. This eases tolerance requirements for packaging the integrated optical chip with external optical fiber inputs or outputs.

Figure 6A:
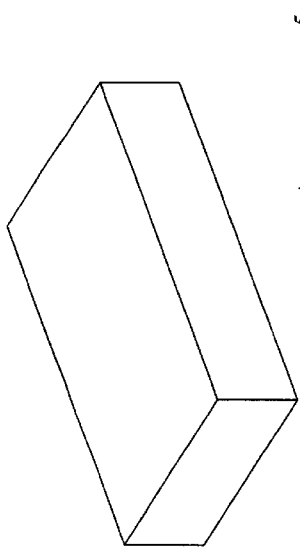
FIGS. 6(a)–6(f) illustrate processes for providing an integrated optical waveguide device with an integrated optical filter according to an embodiment of the present invention.
Figure 6B:
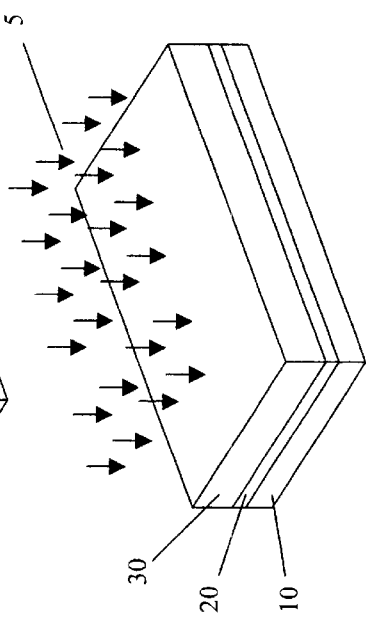

A method for providing an optical waveguide with an integrated optical filter according to an embodiment of the present invention will now be described with reference to FIGS. 6(a)–6(e). FIG. 6(a) illustrates a perspective view of the starting material—a planer crystalline silicon substrate. In FIG. 6(b), the crystalline silicon substrate is subjected to ion implantation to form an insulating dielectric layer 20 below the surface of the crystalline silicon substrate but above a lower silicon substrate layer 10. The planar substrate is subjected to high energy ionized species 5 implantation to form the silicon dielectric layer, which may consist of silicon dielectric compounds, such as silicon oxide or silicon nitride. The layer above the dielectric layer 20 is a waveguide rib layer 30, where the integrated optical waveguide device is to be formed. Because the dielectric layer 20, which comprises silicon dielectric compounds, and the waveguide rib layer 30, which comprises silicon, have highly contrast refractive indexes, a planar substrate having index-contrast regions is formed. In one implementation, the refractive index of the waveguide ribs layer comprising essentially crystalline silicon is about 3.44, and the refractive index of the silicon dioxide dielectric layer is about 1.44.

Figure 6C:
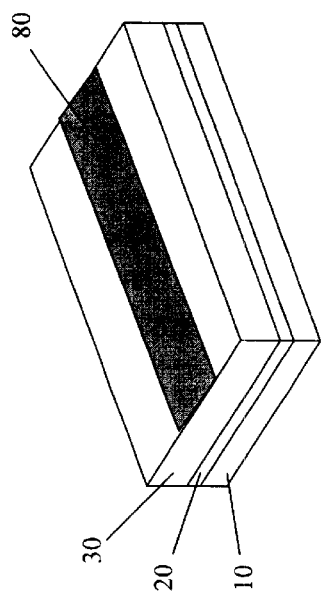

In FIG. 6(c), an optical waveguide is created on the planar substrate through etching and patterning the waveguide ribs layer. In one implementation, a mask 80 is placed on top of the waveguide rib layer 30 to cover regions where the optical waveguide is to be formed and expose regions where trenches are to be formed. This allows an etching technique, such as anisotropic RIE, to be carried out to form the optical waveguide in the waveguide rib layer 30. Anisotropic RIE can create isolation regions less than one micron wide and several microns deep. The structure and thickness of the mask 80 depend upon the chemistry and conditions of the RIE to be used. A discharge in a gas is provided and the waveguide rib layer 30 is etched by chemical entities formed in the discharge. The etching is ultimately achieved through chemical reaction of the discharge entities with the waveguide rib layer 30 of the SOI substrate.

Figure 6D:
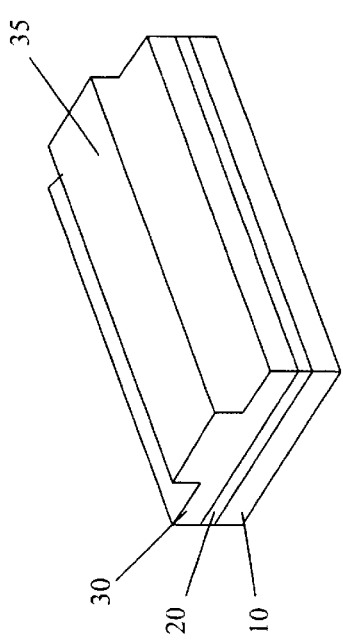
Figure 6E:
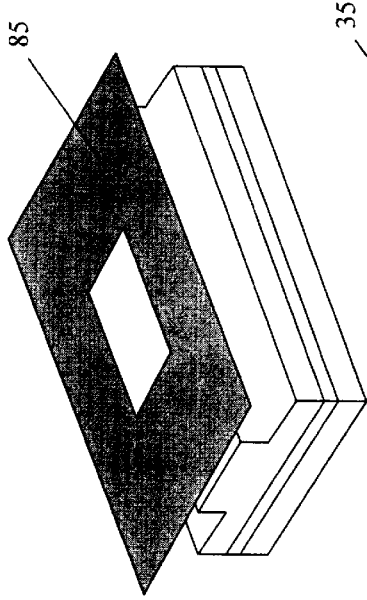
Figure 6F:
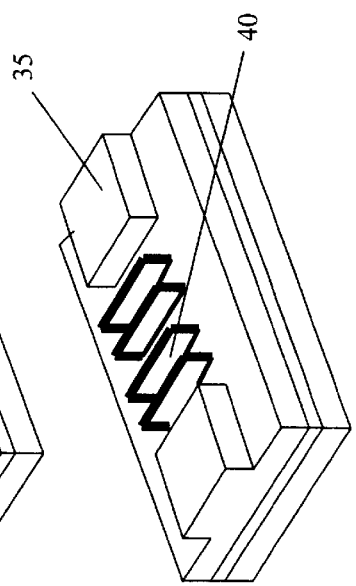

FIG. 6(d) shows the optical waveguide 35 formed in the waveguide rib layer 30 as the result of etching, after the removal of the mask 80. The optical waveguide 35, being a straight-channeled waveguide, is geometrically patterned to give a lateral confinement of optical signals. An optical filter structure is then created in the optical waveguide 35 by utilizing the index-contrast of the index-contrast regions in the planar substrate. In FIG. 6(e), a device, preferably a mask 85, suitable for creating the optical filter structure is placed on top of the optical waveguide layer 30. The mask contains exposed regions that allow the optical filter structure 40, in the form of multi-cavity filters, to be fabricated. Conventional mask alignment tools are utilized to provide precise alignment between the successive processing steps of forming the optical waveguide 35 and the optical filter structure 40. In one implementation, one-dimensional photonic band gap grating filter devices are formed as periodic dielectric structures that prohibit propagation of electromagnetic waves in a specific frequency range. Shown in FIG. 6(f), the optical filter structure 40 is integrated onto the same planar substrate as the optical waveguide 35, resulting in ultra-compact filter structures and alleviating expansive and time-consuming hybrid alignment of optical filters and optical waveguides.

According to another embodiment of the invention, the entire optical waveguide 35 with the integrated optical filter structure 40 is produced in one single etching step. This essentially combines the processing steps shown in FIG. 6(c) and FIG. 6(e), wherein a mask that allows the fabrication of both the optical waveguide 35 and the integrated optical filter structure 40 is utilized. In other embodiments, the waveguide may also be integrated with electro-optic and electronic components before and/or after the etching process.

Figure 7A:
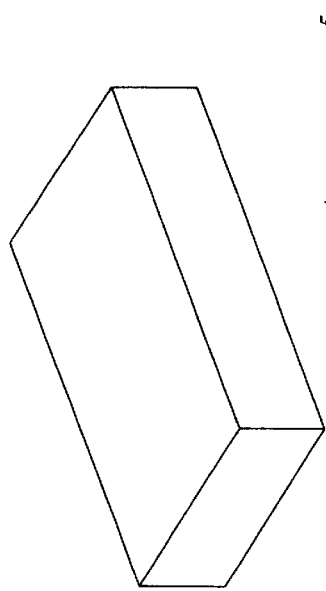
FIGS. 7(a)–7(f) illustrate processes for providing a zig-zag optical waveguide with integrated WDM filters according to an embodiment of the present invention.
Figure 7B:
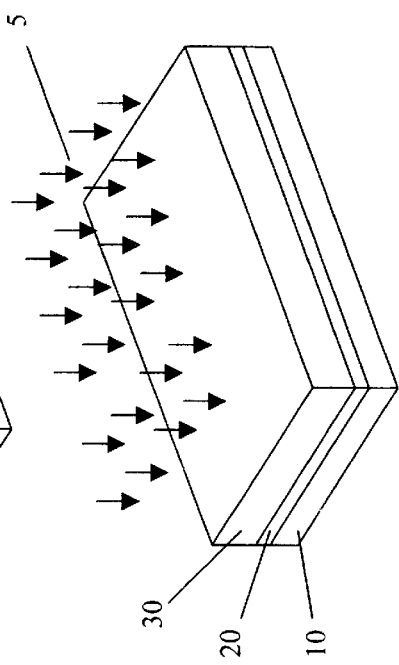

FIGS. 7(a)–7(e) illustrate processes for providing a zig-zag optical waveguide structure with integrated WDM filters according to an embodiment of the present invention, forming an optical multiplexing/demultiplexing device. FIGS. 7(a)–7(e) are similar to FIGS. 6(a)–6(e), except that multiple optical waveguides with integrated WDM filters in a zig-zag fashion are formed in a waveguide rib layer 30. In FIG. 7(a), a perspective view of a planer crystalline silicon substrate is shown. In FIG. 7(b), the crystalline silicon substrate is subjected to ion implantation, such as high energy ionized species 5, to form an insulating dielectric layer 20 below the surface of the crystalline silicon substrate but above a lower silicon substrate layer 10. This creates index-contrast regions, one region being the waveguide rib layer 30 and the other region being the insulating dielectric layer 20.

Figure 7C:
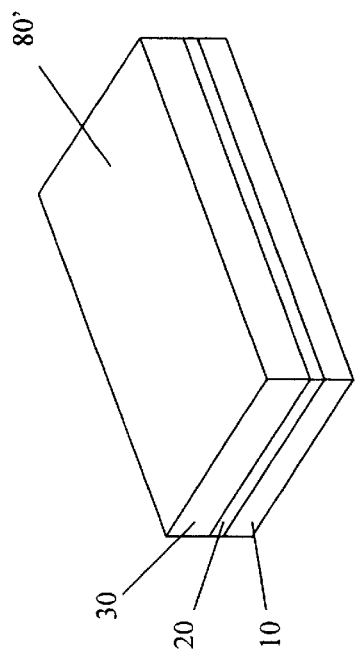

In FIG. 7(c), a zig-zag optical waveguide structure comprising a plurality of optical waveguides is prepared to be formed on the planar substrate for transmission of light, and specifically, in the waveguide rib layer 30. In this example, four optical waveguides are illustrated. A mask 80' is placed on top of the waveguide rib layer 30 to cover regions where the zig-zag optical waveguide structure is to be formed and expose regions where trenches are to be formed. Etching and patterning processes are then carried out, utilizing mask alignment tools and electron-beam lithography, to form the zig-zag optical waveguide structure.

Figure 7D:
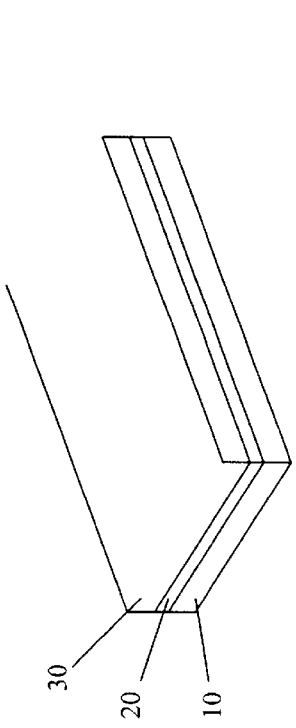
Figure 7E:
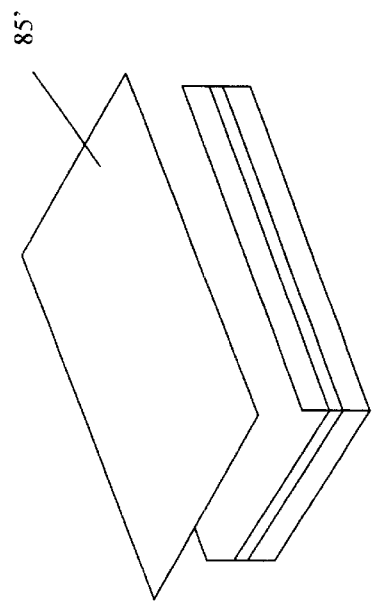

FIG. 7(d) shows the zig-zag optical waveguide structure 65 formed in the waveguide rib layer 30 as the result of etching and patterning, after the removal of the mask 80'. In other embodiments, the structure may also be integrated with electro-optic and electronic components. WDM filters are then created in the zig-zag optical waveguide structure by utilizing the index-contrast of the index-contrast regions in the planar substrate. In FIG. 7(e), a device, preferably a mask 85', suitable for creating the WDM filters is placed on top of the optical waveguide layer 30. The mask contains exposed regions that allow the WDM filters, in the form of multi-cavity filters, to be fabricated. Conventional mask alignment tools are also utilized to provide precise alignment between the successive processing steps of forming the zig-zag optical waveguide structure and the WDM filters.

Figure 7F:
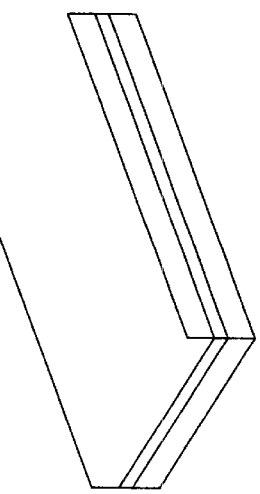

Shown in FIG. 7(f), the zig-zag optical waveguide structure 65 integrated with the WDM filters 40–43 form an optical waveguide multiplexing/demultiplexing device. There is a unique optical filter for each optical waveguide, and the optical filter is integrated onto the same planar substrate as the corresponding optical waveguide. In a demultiplexer, when light travels through an optical waveguide encounters an optical filter, light with certain wavelengths is reflectively coupled into the next waveguide while certain other wavelengths are not reflected and pass through the optical filter. By cascading several optical filters with zig-zag type waveguide structures, large channel count WDM fiber optic systems are realized. In this example, a four channel WDM fiber optic system is illustrated.

Figure 8A:
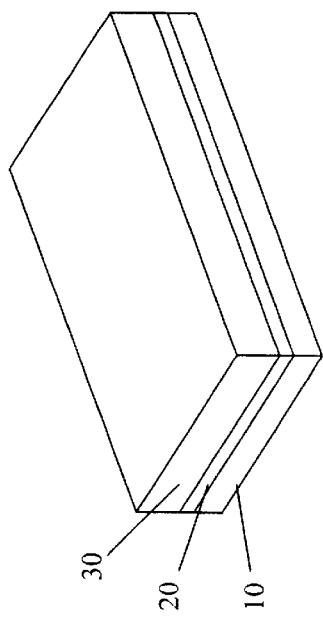
FIGS. 8(a)–8(g) illustrate processes for providing an integrated optical mode taper structure according to an embodiment of the present invention.
Figure 8B:
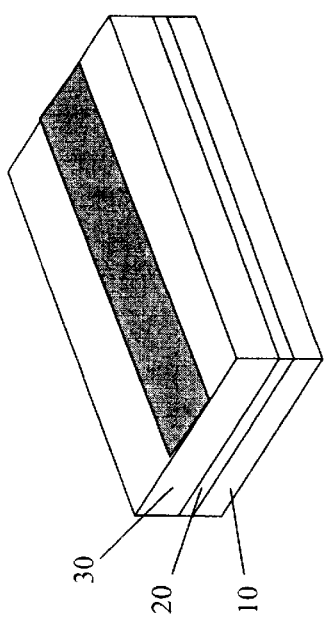
Figure 8C:
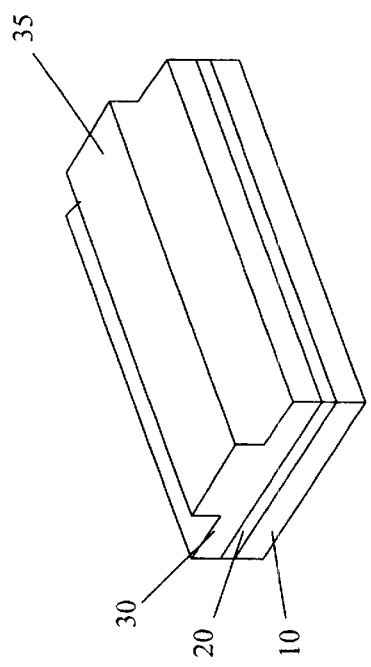

A method for providing an integrated optical mode taper structure according to an embodiment of the present invention will now be described with reference to FIGS. 8(a)–8(g). In FIG. 8(a), a planar substrate containing index-contrast regions is provided, with a lower silicon substrate layer 10, a dielectric layer 20 and a waveguide rib layer 30. In FIG. 8(b), a mask 80 is placed on top of the waveguide rib layer. By utilizing mask alignment tools and electron-beam lithography, an optical waveguide 35 is formed on the planar substrate for transmission of light, as shown in FIG. 8(c).

Figure 8E:
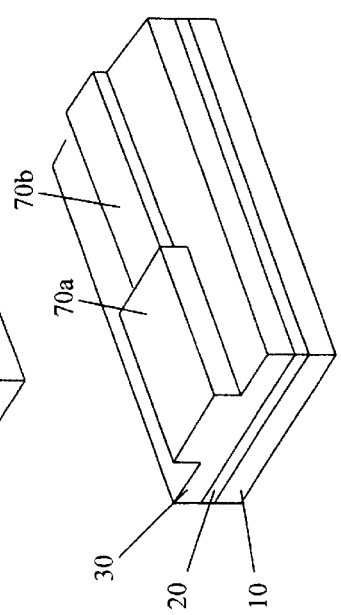
Figure 8D:
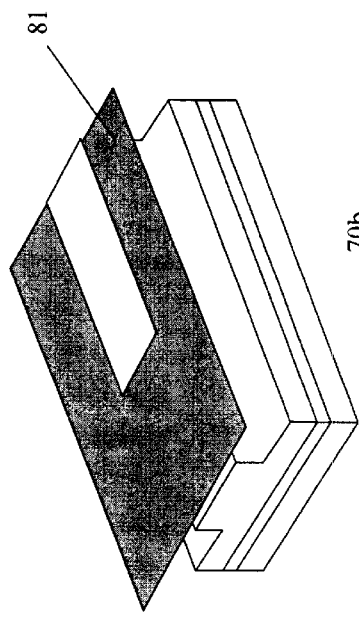
Figure 8F:
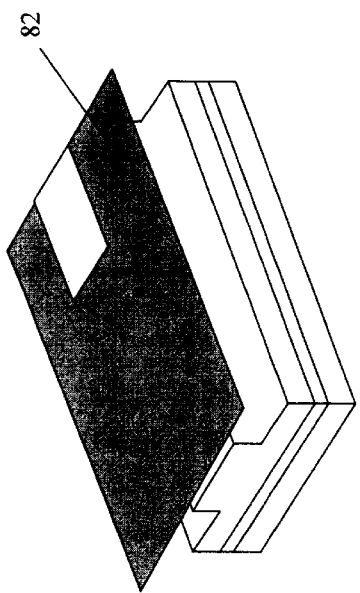
Figure 8G:
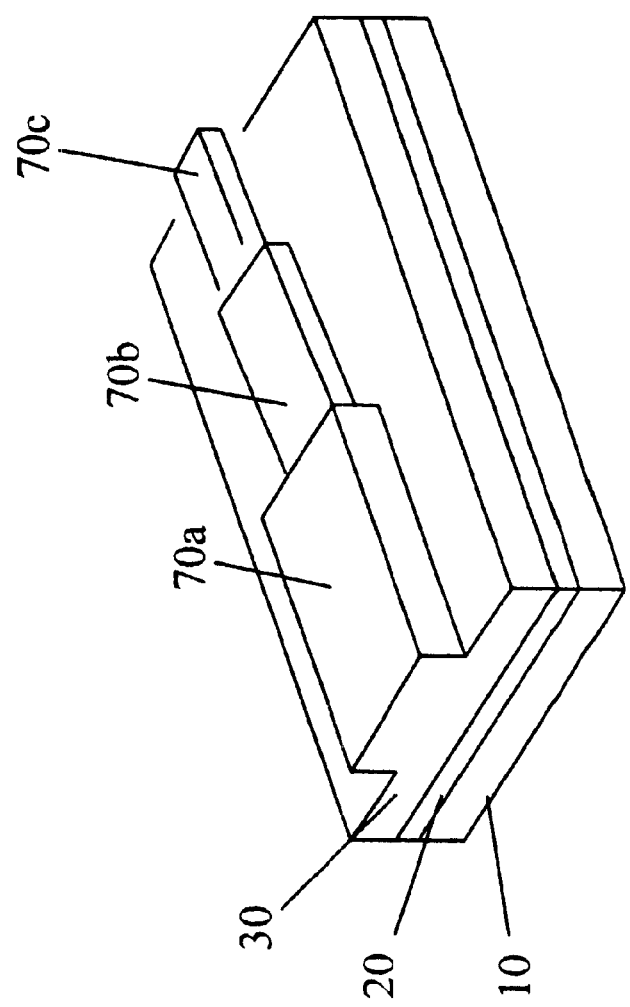

An optical mode expansion/taper structure is then created at the input of the optical waveguide, providing mode-matching between an optical fiber mode and the optical waveguide mode. The mode expansion structure gradually expands the optical waveguide mode to ease optical fiber-optical waveguide coupling. In one implementation, a vertical waveguide taper is formed by multi-step lithography steps that etch the optical waveguide 35 into different etch depth in each lithography step, creating a stair-case taper in the vertical direction. In this example, the stair-case taper consists of waveguide sections 70a, 70b, 70c, the latter section having an etch depth lower than the previous section. In FIG. 8(d), a mask 81 is utilized to form a first etch depth of the stair-case taper, i.e., the depth for waveguide section 70b. After the etching process, the structure shown in FIG. 8(e) is formed. In FIG. 8(f) another mask 82 is utilized to form a second etch depth of the stair-case taper, i.e., the depth for waveguide section 70c. After the etching process, the structure shown in FIG. 8(g) is formed. Although three waveguide sections 70a, 70b, 70c are shown in this example, the optical waveguide 35 may include any number of waveguide sections, each being formed in a lithography or etching step.

In other embodiments of the invention, instead of using multiple lithography steps, chirped periodic discontinuity in the optical waveguide is introduced to provide the same effect. In this case, the effective medium index is diluted by varying the duty cycle of the periodic waveguide. By reducing the effective medium index, a reduced confinement factor for the optical waveguide mode is achieved. Similar to the case of a vertical dimension stair-case taper formed by multiple lithography steps, a gradual expansion of the optical waveguide mode is realized in the chirped periodic waveguide. The mode expansion structure at the input of the optical waveguide 35 allows light to be efficiently coupled, providing good mode-matching to an optical fiber connected to the optical waveguide 35.

Embodiments of the invention and method as set forth above provide the ability to inexpensively, reliably and efficiently create planar integrated filter-waveguide multiplexing and demultiplexing structures for advanced systems. The power of integrated circuit style batch processing utilized in the manufacturing of the planar integrated filter-waveguide structures lowers manufacturing costs. The benefits of low optical propagation loss, ease of fabrication, ability to add new optical/optoelectronic functionality and readily available active waveguides allows the creation of a variety of integrated optical technologies. For example, instead of using optical waveguides to implement WDM, optical waveguides can also be used in the implementation of other basic building blocks of optical circuits, such as directional couplers, optical switches, optical modulators and optical interconnects between various components of an optical circuit.

Embodiments of the present invention further provide the ability to reduce expensive and time consuming alignment processes and sub-micron accuracy requirements in hybrid packaging of WDM filters with optical fibers, achieve compact size filter-waveguide structures that are easily scalable to large channel count and narrow channel spacing, and simplify fiber-waveguide coupling. In the present invention, the filter is preferably fabricated in the same optical chip as the optical waveguide, ensuring low-loss coupling from the optical waveguide to the grating filter and avoiding manual alignment process. Compact size filter-waveguide structures are realized because ultra-small grating filters of the size of a single-mode optical waveguide can be achieved using the index-contrast inherent in a SOI waveguide system. The small filter size enables easy scaling of the filters to large channel count WDM systems. Moreover, the fiber-waveguide coupling is simplified with monolithically integrated mode-taper.

While the description above refers to particular embodiments of the present invention, it will be understood that many modifications may be made without departing from the spirit thereof. For example, the waveguide may be embedded in a substrate as dielectric layers embedded in a cladding region, with the optical filter integrated in the same substrate. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical waveguide device, comprising:
   a lower substrate layer;
   an insulating dielectric layer positioned above said lower substrate layer, said dielectric layer having a first refractive index;
   a waveguide ribs layer positioned above said dielectric layer, said waveguides ribs layer having a second refractive index and formed into an optical waveguide for transmission of light, the second refractive index being different from the first refractive index; and
   a wavelength division multiplexing (WDM) optical filter formed in the waveguide ribs layer, wherein the WDM optical filter is integrated onto the same substrate as the optical waveguide.

2. The optical waveguide device of claim 1, wherein the WDM optical filter is realized by utilizing index contrast between the first refractive index and the second refractive index.

3. The optical waveguide device of claim 1, wherein the WDM optical filter is formed by grating filters.

4. The optical waveguide device of claim 1, wherein the WDM optical filter is formed by an one-dimensional photonic band gap structure.

5. The optical waveguide device of claim 1, wherein the optical waveguide device is based on a silicon-on-insulator system, the planar substrate being a crystalline silicon substrate and the insulating dielectric layer being a silicon dioxide.

6. The optical waveguide device of claim 1, further comprising electro-optic or electronic components integrated with the optical waveguide device.

7. The optical waveguide device of claim 1, further comprising a mode expansion structure at the input of the optical waveguide to ease optical fiber-optical waveguide coupling.

8. The optical waveguide device of claim 1, wherein the optical waveguide and the WDM optical filter are fabricated utilizing mask alignment tools and electron-beam lithography.

9. A wavelength division demultiplexing filter device, comprising:
   a planar substrate having index-contrast regions, the planar substrate having a first regional having a first refractive index and a second region having a second refractive index, the second refractive index being different from the first refractive index;
   at least a first optical waveguide and a second optical waveguide situated on the planar substrate for transmission of light, the waveguides being formed from the planar substrate, and
   a plurality of wavelength division multiplexed (WDM) optical filters realized by utilizing index-contrast of the index contrast regions, each WDM optical filter corresponding to an optical waveguide such that light with certain wavelengths is reflectively coupled into the second optical waveguide while light with certain other wavelengths is not reflected and passes through the optical filter, wherein the WDM optical filters are integrated onto the same planar substrate as the corresponding optical waveguides, and the at least first optical waveguide and the second optical waveguide are coupled in a zig-zag pattern.

10. The wavelength division demultiplexing filter device of claim 9, wherein the plurality of WDM optical filters are formed by grating filters.

11. The wavelength division demultiplexing filter device of claim 9, wherein the plurality of WDM optical filters are formed by one-dimensional photonic band structures.

12. The wavelength division demultiplexing filter device of claim 9, wherein the device is based on a silicon-on-insulator system, the first region of the planar substrate being a crystalline silicon substrate and the second region of the planar substrate being insulating dielectric layer.

13. The wavelength division demultiplexing filter device of claim 9, further comprising electro-optic or electronic components integrated with the optical waveguides.

14. The wavelength division demultiplexing device of claim 9, wherein the optical waveguides and the WDM optical filters are fabricated utilizing mask alignment tools and electron-bam lithography.

15. The wavelength division demultiplexing filter device of claim 9, further comprising a mode expansion structure at the input of the first optical waveguide to ease optical fiber-optical waveguide coupling.

16. A method of fabricating an optical waveguide device, the method comprising:
   providing a planar substrate having index-contrast regions, the planar substrate having a first region having a first refractive index and a second region having a second refractive index, the second refractive index being different from the first refractive index;
   creating an optical waveguide on the planar substrate for transmission of light; and
   creating a wavelength division multiplexed (WDM) optical filter in the optical waveguide, wherein the WDM optical filter is integrated onto the same planar substrate as the optical waveguide.

17. The method of claim 16, wherein the optical waveguide and the WDM optical filter are fabricated utilizing mask alignment tools and electron-beam lithography.

18. The method of claim 16, further comprising providing a mode expansion structure at the input of the optical waveguide to ease optical fiber-optical waveguide coupling.

19. The method of claim 16, further providing fine-tuning and post-fabrication trimming of WDM filter response of the WDM optical filter.

20. The method of claim 16, wherein the WDM optical filter is created by utilizing index-contrast of the index-contrast regions.

21. The method of claim 16, wherein the WDM optical filter is formed by grating filters.

22. The method of claim 16, wherein the WDM optical filter is formed by one-dimensional photonic band gap structures.

23. The method of claim 16, wherein the optical waveguide device is based on a silicon-on-insulator system, the first region of the planar substrate comprising crystalline silicon substrate, and the second region comprising an insulating dielectric layer.

24. The method of claim 16, further comprising integrating electro-optic or electronic components with the optical waveguide device.

25. A method of fabricating a wavelength division demultiplexing filter device, the method comprising:
   providing a planar substrate having index-contrast regions, the planar substrate having a first regional having a first refractive index and a second region having a second refractive index, the second refractive index being different from the first refractive index;
   creating at least a first optical waveguide and a second optical waveguide situated on the planar substrate for transmission of light, the waveguides being formed from the planar substrate, and
   creating a plurality of wavelength division multiplexed (WDM) optical filters realized by utilizing index-contrast of the index contrast regions, each WDM optical filter corresponding to an optical waveguide such that light with certain wavelengths is reflectively coupled into the second optical waveguide while light with certain other wavelengths is not reflected and passes through the optical filter, wherein the WDM optical filters are integrated onto the same planar substrate as the corresponding optical waveguides, and the at least first optical waveguide and the second optical waveguide are coupled in a zig-zag pattern.

26. The method of claim 25, wherein the plurality of WDM optical filters are formed by grating filters.

27. The method of claim 25, wherein the plurality of WDM optical filters are formed by one-dimensional photonic band gap structures.

28. The method of claim 25, wherein the device is based on a silicon-on-insulator system, the first region of the planar substrate being a crystalline silicon substrate and the second region of the planar substrate being an insulating dielectric layer.

29. The method of claim 25, further comprising integrating electro-optic or electronic components with the optical waveguides.

30. The method of claim 25, wherein the optical waveguides and the WDM optical filters are fabricated utilizing mask alignment tools and electron-beam lithography.

31. The method of claim 25, further comprising a mode expansion structure at the input of the first optical waveguide to ease optical fiber-optical waveguide coupling.

32. A method of providing mode-matching between an optical fiber mode and an optical waveguide mode, the method comprising:

providing a planar substrate;

creating an optical waveguide on the planar substrate for transmission of light;

introducing a taper by introducing a chirped periodic discontinuity in the optical waveguide as a mode expansion structure at the input of the optical waveguide, wherein the mode expansion structure gradually expands the optical waveguide mode to ease optical fiber-optical waveguide coupling.

33. A method of providing mode-matching between an optical fiber mode and an optical waveguide mode, the method comprising:

providing a planar substrate;

creating an optical waveguide on the planar substrate for transmission of light;

introducing a mode expansion structure at an input of the optical waveguide, wherein the mode expansion structure gradually expands the optical waveguide mode to ease optical fiber-optical waveguide coupling, and a vertical waveguide taper is formed by multi-step lithography that etches the optical waveguide into a different etch depth in each lithography step, forming a stair-case taper in a vertical direction.

34. The method of claim 33, wherein isotropic etches are used to smooth and round the edges of the stair-case taper.

35. The method of claim 33, further comprising integrated electro-optical components with the optical waveguide.

* * * * *